(12) United States Patent
Bousfield

(10) Patent No.: US 7,866,610 B2
(45) Date of Patent: Jan. 11, 2011

(54) TELESCOPING WING AND AIRFOIL CONTROL MECHANISM

(76) Inventor: Samuel Hall Bousfield, 1820 Hillish Rock Rd., Meadow Vista, CA (US) 95722

( * ) Notice: Subject to any disclaimer, the term of this patent is extended or adjusted under 35 U.S.C. 154(b) by 530 days.

(21) Appl. No.: 12/005,600

(22) Filed: Dec. 28, 2007

(65) Prior Publication Data

US 2009/0166477 A1 Jul. 2, 2009

(51) Int. Cl.
*B64C 3/54* (2006.01)
(52) U.S. Cl. .......................... 244/218; 244/46
(58) Field of Classification Search ............... 244/45 R, 244/123.11, 123.14, 123.9, 49, 46, 48, 218
See application file for complete search history.

(56) References Cited

U.S. PATENT DOCUMENTS

| | | | | | |
|---|---|---|---|---|---|
| 1,718,577 | A | * | 6/1929 | Pitcairn | 416/88 |
| 2,423,095 | A | * | 7/1947 | Gibson | 244/218 |
| 2,713,393 | A | * | 7/1955 | Isacco | 416/88 |
| 3,065,938 | A | * | 11/1962 | Calkins | 244/46 |
| 3,162,401 | A | * | 12/1964 | Hopwood | 244/207 |
| 4,685,410 | A | * | 8/1987 | Fuller | 114/39.31 |

* cited by examiner

*Primary Examiner*—Rob Swiatek
*Assistant Examiner*—Michael Kreiner

(57) ABSTRACT

This invention relates generally to a collapsible, nesting wing structure with or without wing warp flight control. The invention also incorporates means to maintain wing extension during flight, methods of wing construction for nesting collapsible wings, and control surfaces for collapsible wings.

14 Claims, 11 Drawing Sheets

TELESCOPING WING AND AIRFOIL CONTROL MECHANISM

CROSS REFERENCE TO RELATED APPLICATIONS

N/A

STATEMENT REGARDING FEDERALLY SPONSORED RESEARCH AND DEVELOPMENT

No State or Federal funds were used for the research and development of this invention.

REFERENCE TO SEQUENCE LISTING, A TABLE, OR A COMPUTER PROGRAM LISTING COMPACT DISC APPENDIX

N/A

BACKGROUND OF THE INVENTION

Differing aircraft wing designs are as old as flight itself, or perhaps older, considering the many designs penned by Michelangelo. Specifically, the Wright Brothers airplane in what is considered Man's first powered flight utilized wing warping for flight control. As ambition loaded wings more heavily in the years following, a fixed wing and movable control surfaces became the control means of choice. This trend has maintained until present day. Recently, NASA, among others, began exploring wing warp control for use in drones or unmanned air vehicles.

One such investigation is detailed in American Institute of Aeronautics and Astronautics (AIAA) paper 2007-5347. The investigation described a wing of a micro aircraft that had a shaft sewn into the leading edge, and as the shaft rotated, the wing was warped to provide aileron control. The present invention utilizes wing warp control, but combines this with retractable wing structure.

Retractable or deployable wings have also been described in various ways in the past. Most collapsible wings do so by folding in some fashion. Others have used inflatable wings to accomplish the removal of a wing structure when not needed or wanted. A few have provided extension devices to positively extend and keep a wing extended, whether fully extended or only partially extended. In this fashion, the wing could be extended fully for take-off, and then partially retracted while in cruise. While of obvious benefit, these latter wing extension devices add weight and complexity to aircraft that in the real world depend upon low weight and simplicity to operate. The intent of the present invention is to provide a lightweight retractable wing structure that is simple in design and operation.

Numerous examples exist of folded wing designs, most relating to automobiles being converted to flying craft. Molt Taylor's Air Car is a primary example, and one of the few that saw limited production. Most examples have detachable or folding wings. Another common example of folded wings exist in the aircraft intended for sea operations, as there is limited space on an aircraft carrier and folding wings aids dense aircraft storage. The Corsair was an example of this type of folded-wing design.

One example of a collapsing wing for a land/air vehicle is Robert O. Shertz, whose 1968 U.S. Pat. No. 3,371,886 shows a folded wing design that collapses the wing, one panel over top of another, but the wing panels are not nestled. Inventors Sarh and Branko disclose another example, with many similarities to the present invention, in U.S. Pat. No. 4,824,053. The inventors of this patent have a wing with panels that nestle together, but the nestling is accomplished by having threaded portions of a wing spar move in relation to portions that are not threaded to allow adjacent panels a means to mechanically collapse within each other. This raises the possibility of operating the aircraft with a partially extended wing, which may be advantageous in long-range cruising. The limitation of this design appears to be the lack of overlap between adjacent spar sections when fully extended, which dictates heavier spar sections and a heavy wing design. There is no mention of wing warping or other control mechanisms inherent in the design, nor any means of control being considered for practical use of such a wing.

BRIEF SUMMARY OF THE INVENTION

The present invention provides a means to physically retract or extend airfoils relative to a vehicle body, while keeping the moving structure light and simple in design and operation. One aspect of the invention provides for the extending mechanism to also be utilized for wing warp control, providing a means to direct the flight path as well. Maintaining wing extension during flight is an added feature of the present invention, and is done by utilizing aerodynamic forces rather than structure, to keep weight to a minimum. Special wing panel structure is described as part of the present invention. This wing panel structure maximizes strength of the hollow wing panels described as part of the moving structure, and allows for hollow sections to retain adequate stiffness, and yet be lightweight.

DETAILED DESCRIPTION OF THE INVENTION

Reference will now be made in detail to the preferred embodiment of the invention, which is illustrated in the accompanying drawings. While the invention will be described in conjunction with the preferred embodiment, it will be understood that it is not intended to limit the invention to this embodiment. On the contrary, the invention is intended to cover alternatives, modifications and equivalents, which may be included within the spirit and scope of the invention as defined by the appended claims.

Figure 1:
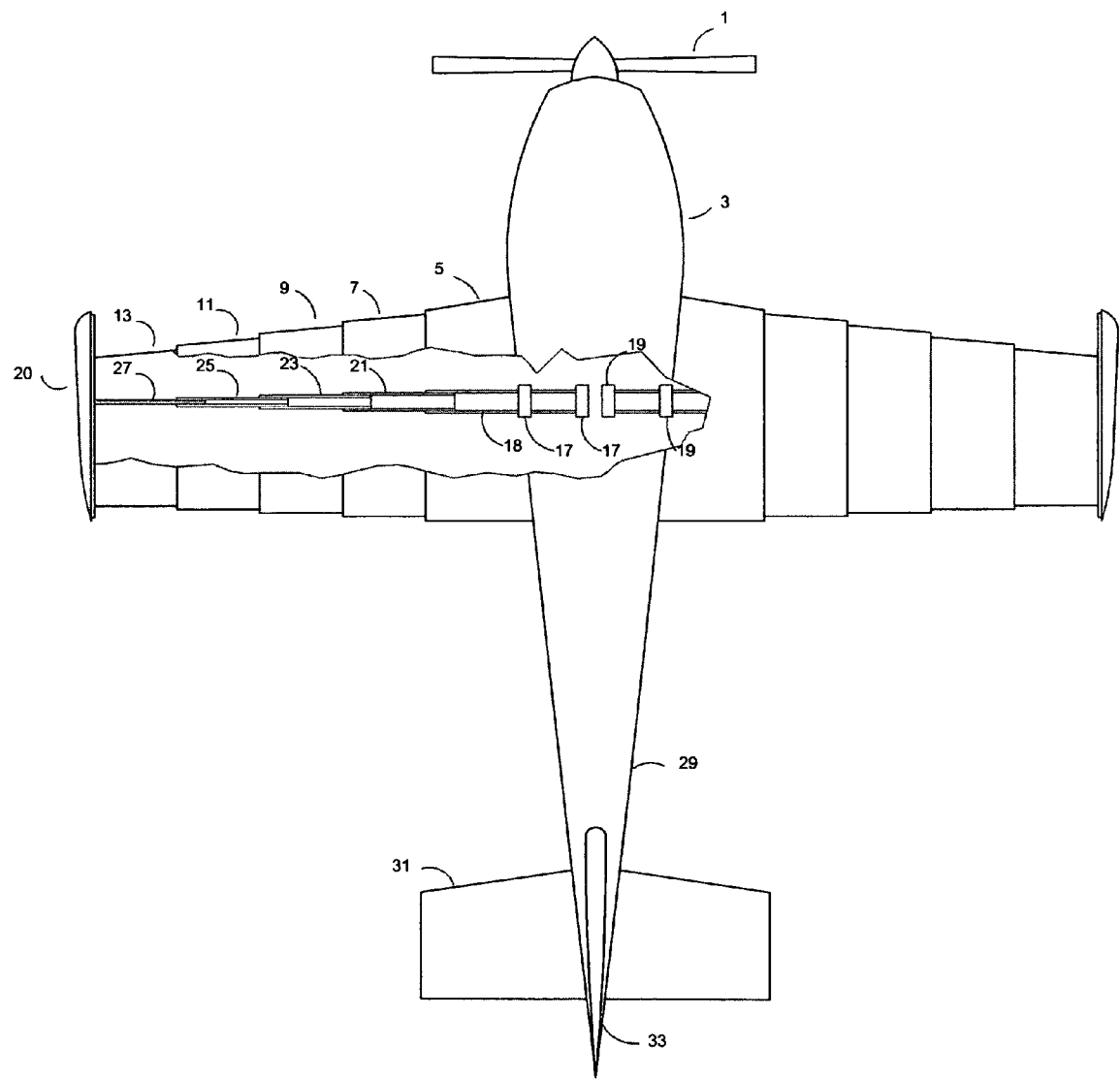
FIG. 1 shows a cut-away view of the preferred embodiment of the assembly on an aircraft with wings extended.
Figure 2:
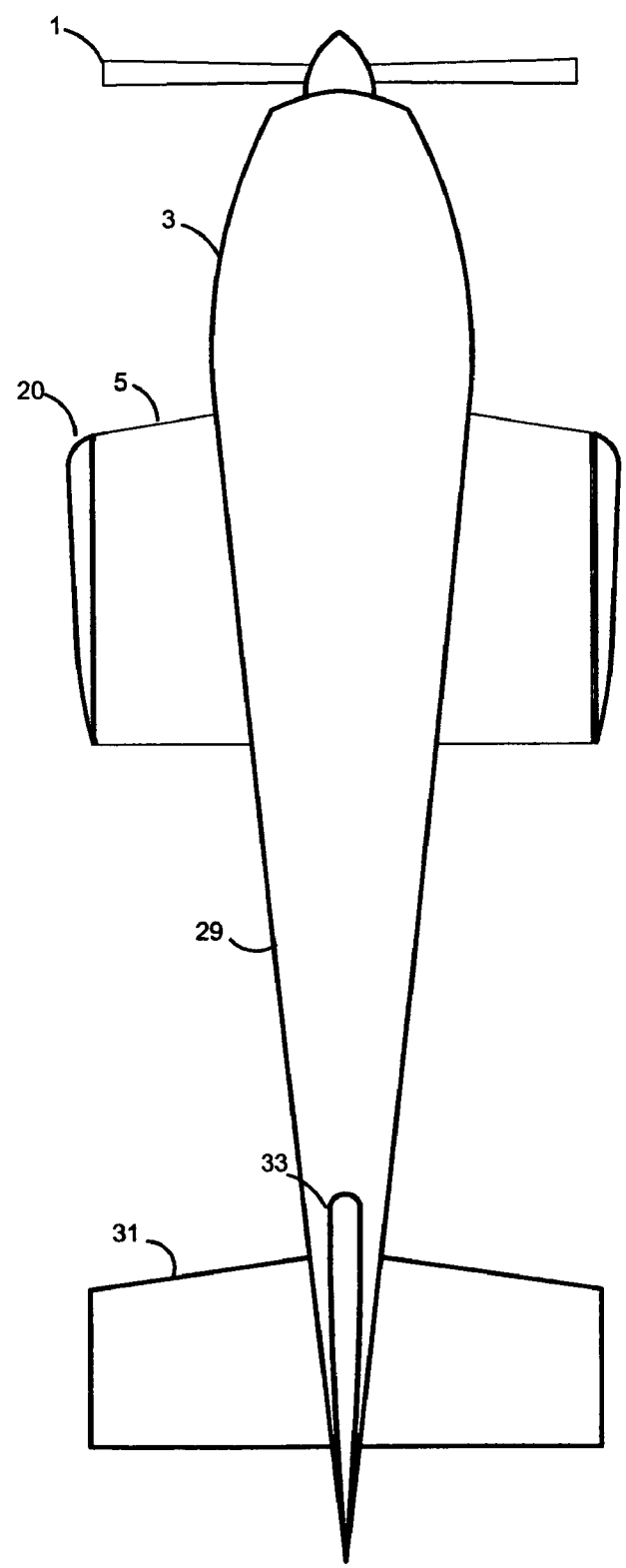
FIG. 2 shows a view of the preferred embodiment with wings retracted.

The present invention, in a general sense, is shown FIG. 1 & FIG. 2. FIG. 1 is a cut-away view of the preferred embodiment of the assembly on an aircraft with wings extended. The view shows a propeller (1), attached to the nose of an aircraft fuselage (3), said fuselage having a hollow wing root (5). Also shown are hollow wing panels (7, 9, 11, 13), which are sized to slide into each other toward said wing root, guided by retractable wing spars (21, 23, 25, 27). At the end of said wing is a wing cap (20) that is used to close off said wing root upon wing retraction. Said wing spars slide toward said wing root into the main wing spar (18), that is attached to the fuselage in various ways, in this drawing by attaching clamps (17, 19). The fuselage continues toward the tail section (29), upon which is mounted the vertical stabilizer (33) and the horizontal stabilizer (31). Although one wing spar is shown, multiple wing spars are possible and may be preferable in some circumstances.

FIG. 2 is a view of the preferred embodiment with wings retracted. Shown is the propeller (1), attached to the fuselage (3), said fuselage having a wing root (5) to store the retracted wings, and having a wing cap (20) which is closing off said wing root as the outermost portion of the retracted wing. Said fuselage continues toward the tail section (29), upon which is mounted the vertical stabilizer (33) and horizontal stabilizer (31). This view shows the potential for narrowing the vehicle width by wing retraction.

Figure 3:
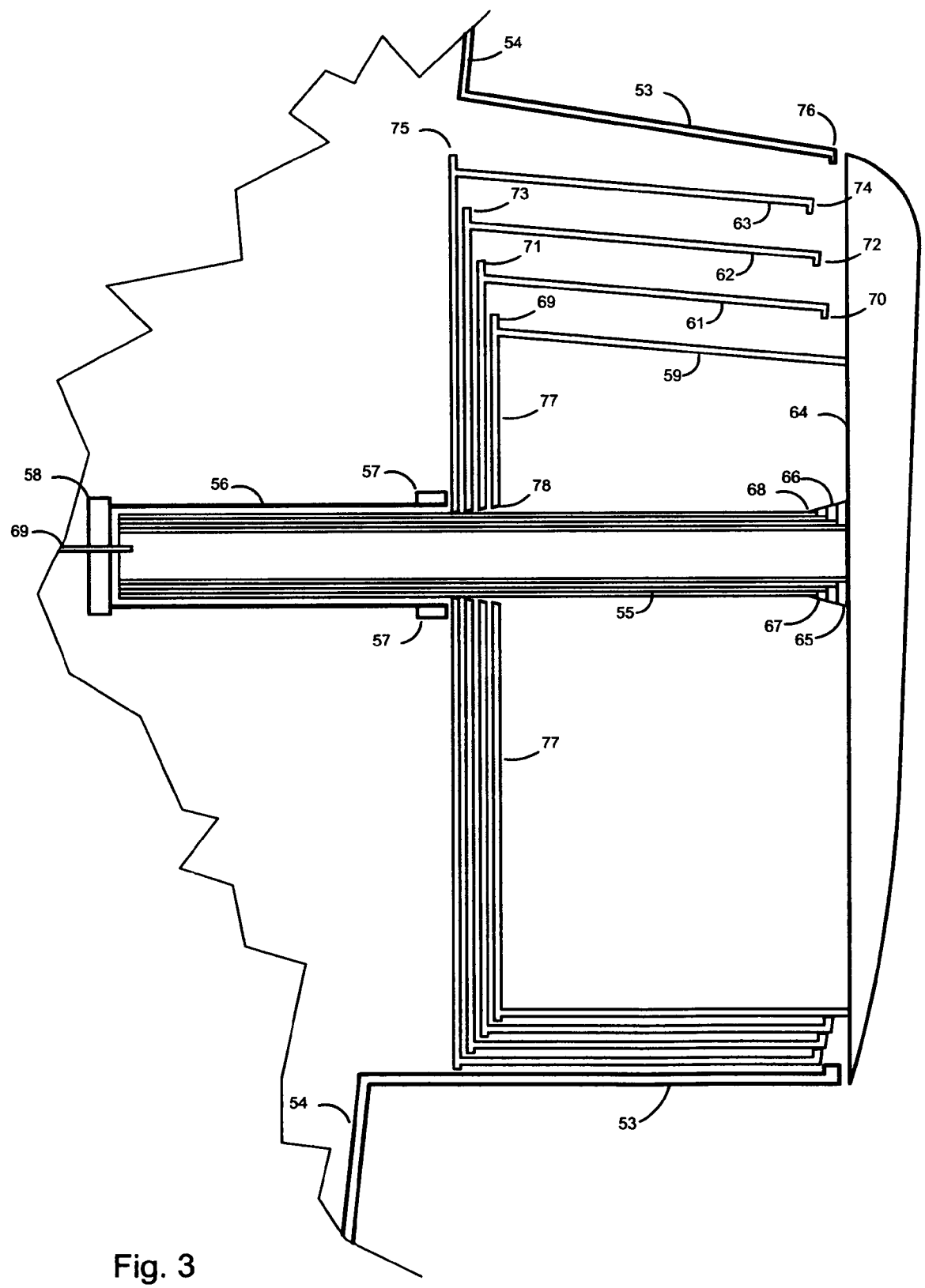
FIG. 3 shows an enlarged cut-away view of the preferred embodiment of the assembly with wings retracted.

A more detailed view of the workings of the retractable wing mechanism is shown in FIG. 3, which is an enlarged cut-away view of the preferred embodiment of the assembly with wings retracted, having a fixed (non-rotating) wing spar. In this view is shown the wing root (53) extending from the fuselage (54), said wing root containing collapsed wing spars (55) retracted into a main wing spar (56). Said main wing spar is attached to said fuselage by attaching clamps (57) and an inner support (58). Alternate means for attaching may be utilized without altering the scope of the patent. Also housed within said wing root are retracted wing panels (59, 61, 62, 63), with one wing panel (59) attached to wing cap (64). The inner-most wing spar is likewise attached to said wing cap, with the remaining said spars being connected to wing panel engagement devices (65, 66, 67, 68), said wing panel engagement devices being shaped to engage the succeeding wing panel upon extension of the wing. Extension of the wing is accomplished by manually pulling out said wing cap or by pressurizing the wing spars through an air pressure line (69). Pressurization of said wing spars forces said wing cap to be pushed out of said wing root along with the inner-most wing spar and wing panel (59). As wing panel (59) is pulled from said wing root, wing panel extension (69) engages the wing panel lip (70) of the next wing panel (61), causing wing panel (61) to be pulled from said wing root. As can be surmised, wing panel extension (71) of wing panel (61) engages wing lip (72) of the next wing panel (62), causing wing panel (62) to be pulled from said wing root. In a similar fashion, wing panel (63) is pulled out of said wing root through engagement of wing panel extension (73) with wing lip (74). Further wing extension is stopped by engagement of wing panel extension (75) with root lip (76), as the wings become fully extended.

In a similar fashion, as wing panel (59) is drawn out of said wing root, it slides over collapsed wing spars (55) until meeting wing panel engagement device (65). In the preferred embodiment, each said wing panel has an open end toward the wing tip, and a closed end (one such shown as 77) toward the fuselage. The said open end has a lip (70, 72, 74) except the panel that is connected to said wing cap. Each closed end has a hole sized to pass said wing spars, an example hole labeled as (78), with wing panel engagement device (65) sized to engage wing panel (59) by means of said hole (78) in said wing panel closed end (77). Said hole is sized to pass over all other said wing panel engagement devices except wing panel engagement device (65). In sequential engagement, wing panel engagement devices (66, 67, 68) engage succeeding wing panels (61, 62, 63), drawing each said wing spar out of said wing root, being fully engaged with corresponding said wing panels. Said wing panel engagement devices are shown conical in cross section for ease of alignment with holes created in said wing panels, however they may be of any shape, providing they engage the appropriate wing panel.

Figure 4:
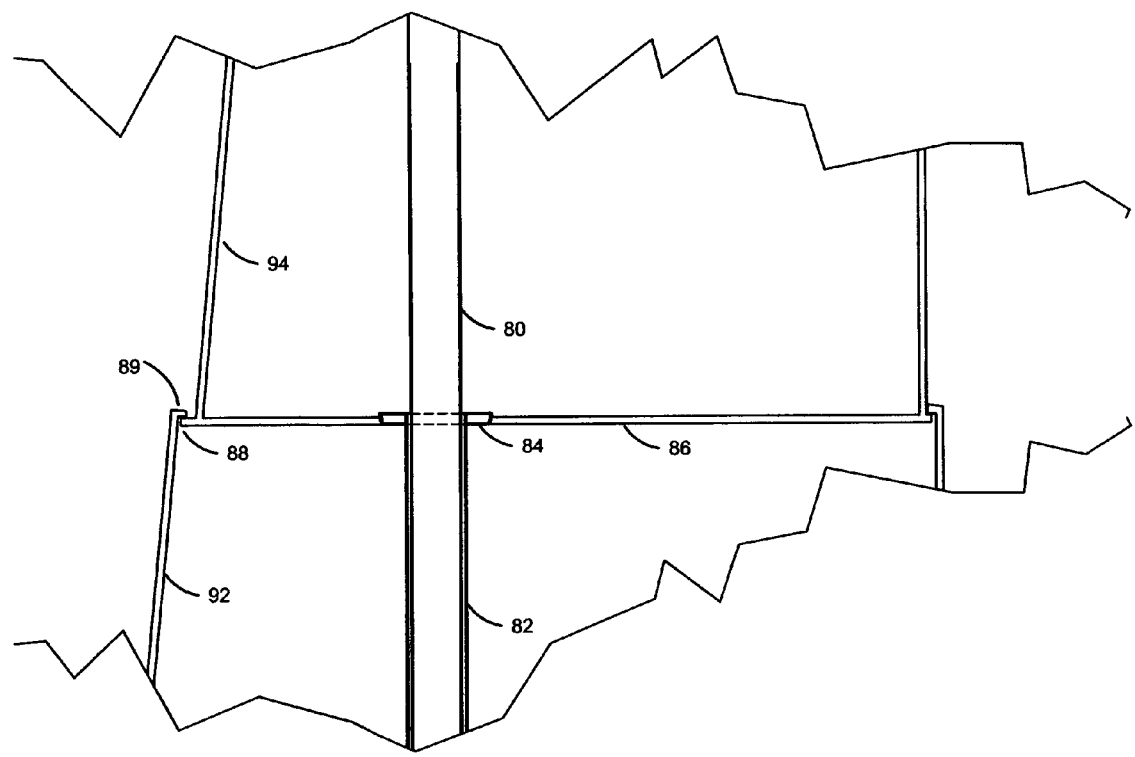
FIG. 4 shows a horizontal cross section view of a portion of the telescoping mechanism as one would see from above or below the wing.

FIG. 4 is a horizontal cross section view of a portion of the telescoping mechanism as one would see from above or below the wing, with the wing being fully extended. In the text to follow, the words inner and outer relate to position relative to the fuselage. One can see an outer wing spar (80) passing through and structurally supported by an inner wing spar (82), said inner wing spar having a wing panel engagement device (84) engaging wing panel (94) at the closed end (86) of said wing panel. Wing panel extension (88) has engaged wing panel lip (89) of the open end of wing panel (92). Structurally, the open ends of each wing panel are supported by contact with the closed ends, as said closed ends act as a rib in typical aircraft construction.

Figure 5:
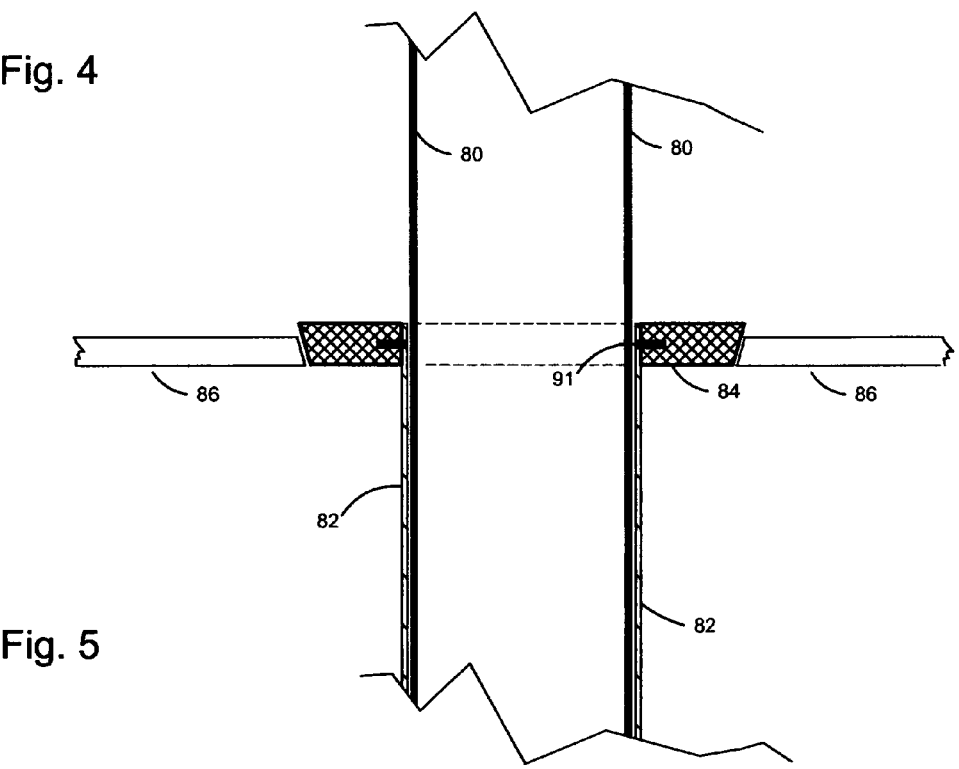
FIG. 5 shows an enlargement of the section view of FIG. 4, showing more detail of the telescoping mechanism.

FIG. 5 is an enlargement of the section view of FIG. 4, showing more detail of the telescoping mechanism. As FIG. 4, outer wing spar (80) passes through and is structurally supported by inner wing spar (82), said inner wing spar having a wing panel engagement device (84). Said wing panel engagement device being fixed to inner spar (82) by fastener (91). Fastening could also be accomplished in any manner, including glue, welding, retaining clips, etc. Said wing spar engaging device is shown engaged with closed end of the next most outer wing panel (86).

Figure 6:
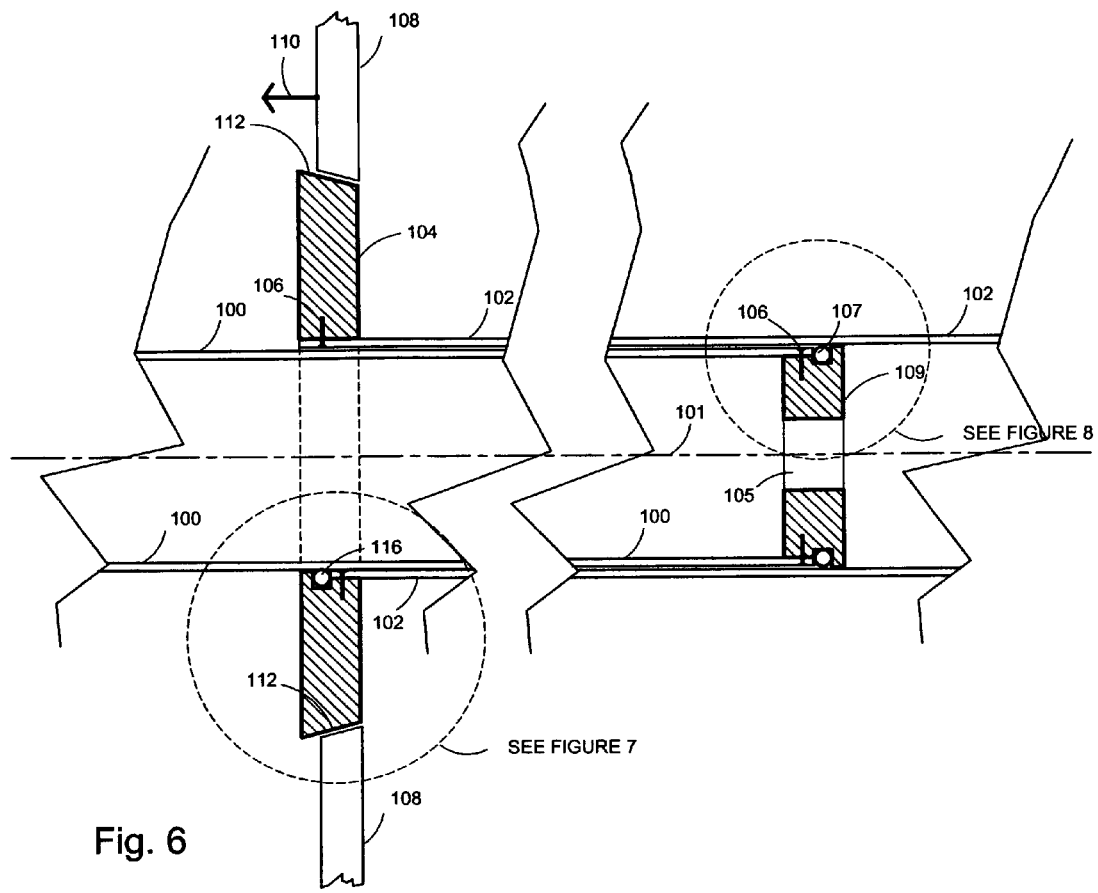
FIG. 6 shows a cut-away view of a portion of the telescoping wing with feature to retain wing panels and wing spar portion from extending past desired position, with roller bearing supports.

The friction of adjacent wing spars during wing extension may cause difficulty in wing extension. To alleviate this, and to use the physics to advantage in keeping the wing extended while in the air, FIG. 6 shows a cut-away view of a portion of the telescoping wing along the wing spars. In this horizontal section, the top of the wing is toward the top of the page, and the bottom of the wing is toward the bottom of the page. This view shows an outer wing spar (100) passing through and being structurally supported by an inner wing spar (102), said outer wing spar having an spar end stiffener (109) with hole (105) to permit air passage, and said stiffener being fixed to said inner spar by screw (106). Roller bearing (107) is integral to said stiffener, and contacts the inner surface of outer spar (102), providing friction relief as the two spars move relative to one another during retraction and extension along the centerline (101) of said spars. Also shown is wing panel engagement device (104), which is fastened to the outermost end of wing spar (102), with said engagement device containing a roller bearing (116) located below, and contacting, wing spar (100). Both roller bearings (107,116) provide friction relief during extension and retraction when the loads on the wing spars are acting perpendicular to the top of the wing and downward, as would be found on the ground prior to take-off. Upon take-off, or when the wing has force acting perpendicular to the bottom of the wing and upward, as would be found in normal flight conditions, wing spar (100) is pushed upward against the outer end of wing spar (102) causing said wing spars to increase the friction between the two said wing spars. This increase in friction during normal flight acts to retain the wings in the extended position without the use of mechanical fasteners.

If the wing were in the process of being extended, you would see a closed end of wing panel (108) with a wing extension force (110) acting to pull said end panel outward. Said closed end wing panel, in moving outward, engages wing panel engagement device (104) at face (112), which would as a consequence pull wing spar (102) outward.

Figure 7:
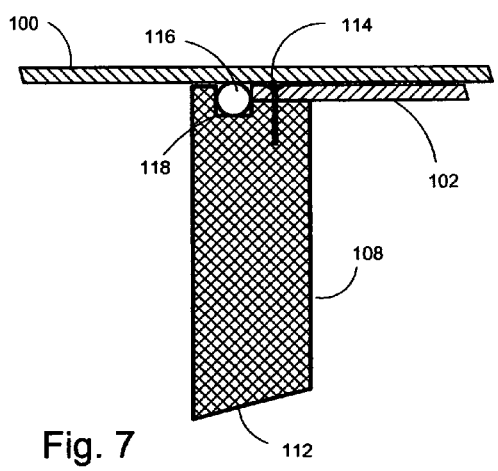
FIG. 7 shows an enlargement of a portion of FIG. 6.

FIG. 7 is an enlargement of a portion of FIG. 6 near the outboard edge of one of the wing spars, showing a wing panel engagement device (112) connected to an inner wing spar (102) via fastener (114), and said engagement device containing roller bearing (116) in a suitable groove (118) such that the said roller bearing contacts the outer wing spar (100) to provide friction relief upon lateral movement of said spars.

Figure 8:
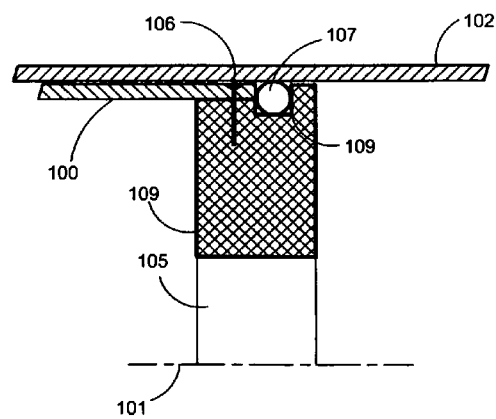
FIG. 8 shows a second enlargement of a portion of FIG. 6.

FIG. 8 is an enlargement of a portion of FIG. 6 near the inboard edge of one of the wing spars, showing a spar end stiffener (109) connected to an outer wing spar (100) via fastener (106), and said stiffener containing roller bearing (107) in a suitable groove (109) such that the said roller bearing contacts the inner wing spar (102) to provide friction relief upon lateral movement of said spars. Roller bearings may be omitted in the lower part of said wing spar stiffener when this additional friction relief is not necessary.

Figure 9:
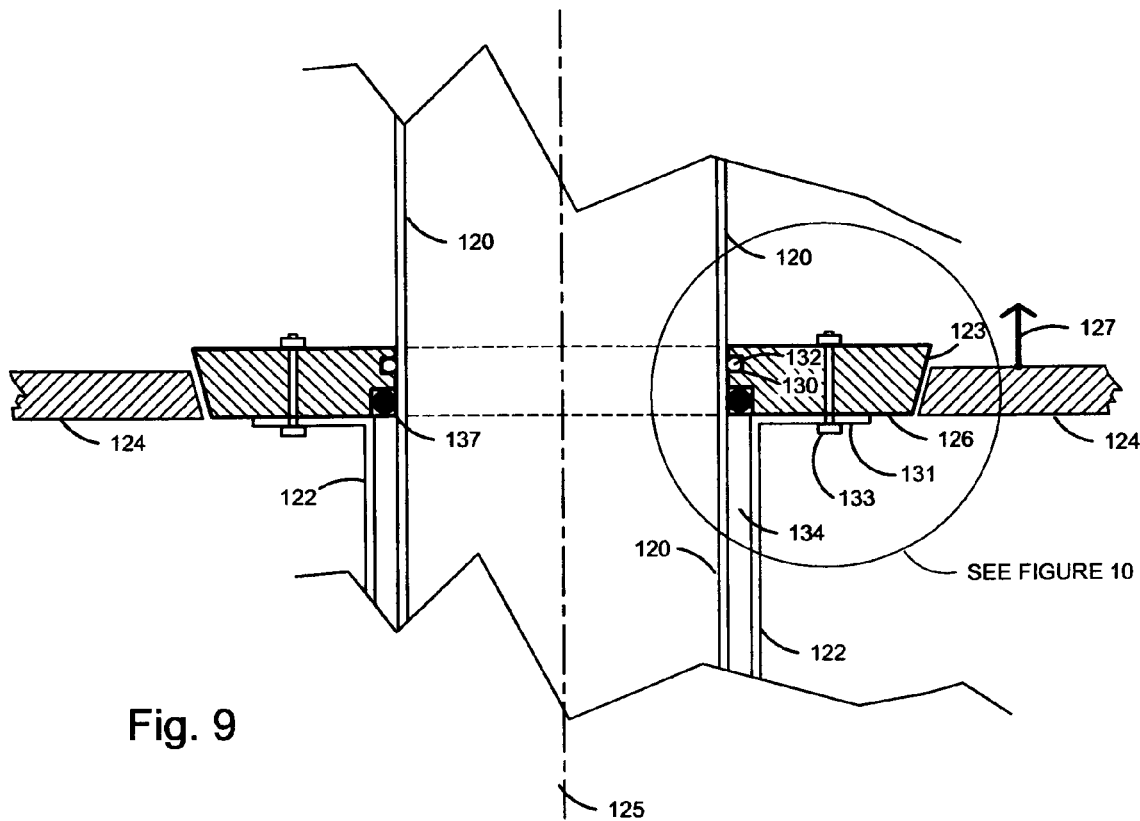
FIG. 9 shows an alternate section of a portion of the telescoping mechanism with attaching means and sealing means.

FIG. 9 shows an alternate section of a portion of the telescoping mechanism with attaching means and sealing means. In this drawing, the wing tip would be to the top of the page, and the fuselage to the bottom. There may be manufacturing limitations in parts of the world where exact fitting wing spars may be difficult. This drawing describes how to accommodate nestling wing spars of varying dimension. An outer spar (120) is shown protruding through an inner spar (122), said inner spar terminating in a plate (131) at ninety degrees to the spar centerline (125). Said plate is fastened to a panel engagement device (126) by bolt (133) or other fastening means. Said panel engagement device has a surface (123) such that when wing panel extension force (127) is applied to a wing panel (124), said wing panel comes into contact with said engagement device at a surface (123), causing spar (122) to also move in the direction of said force. In this drawing is shown a gap (134) between said inner and said outer spars, to show it is possible to provide the extension device with spar sections which are not tight fitting one to another. Orientation and positioning of said inner spar is dictated by contact with roller bearings (137) integral to the said engagement device. An 'O'-ring type seal (132) is also shown, set in a groove (130) in said engagement device to provide sealing if the spar is to be pressurized for extension.

Figure 10:
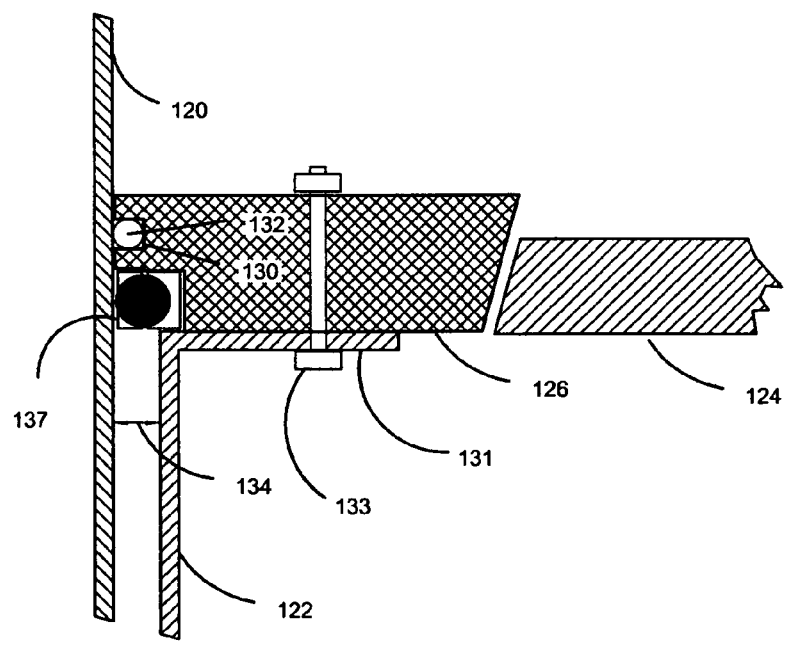
FIG. 10 shows an enlargement of a portion of FIG. 9.

FIG. 10 shows an enlargement of a portion of FIG. 9, and again shows a portion of an outer spar (120), and an inner spar (122), with the outer spar contacting roller bearing (137) set in spar engagement device (126). Said engagement device is fastened to a lip (131) of said inner spar by bolt fasteners (133) or other fastening technique. Again is shown an 'O'-ring seal (132) set in groove (130) in said engagement device, as well as a portion of the closed end wing panel (124) nearly in contact with said wing panel engagement device.

Figure 11:
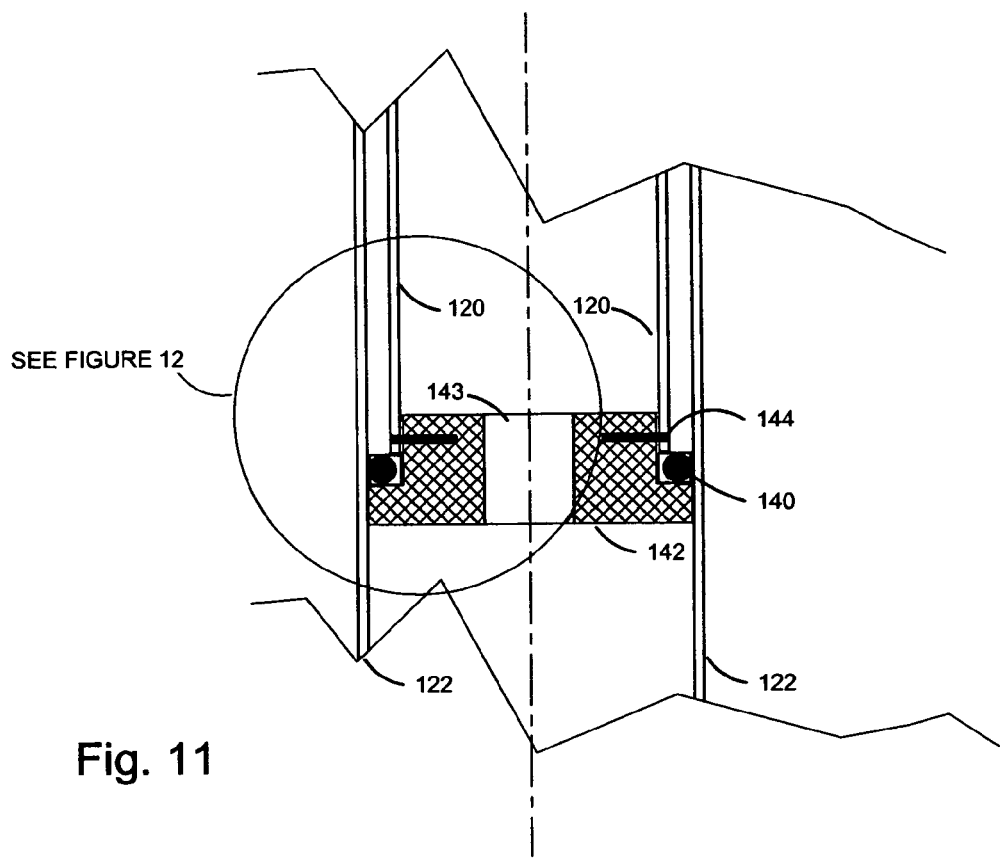
FIG. 11 shows a cut-away view of a portion of a telescoping wing spar having bearings and a seal plate, showing the reciprocal end of the spar mechanism of FIG. 9.

FIG. 11 shows an alternate section of a portion of the telescoping mechanism with attaching means and sealing means, this section being at the fuselage-side terminus of the wing spar from FIG. 9. Shown is a portion of an inner wing spar (122), and the terminus of an outer wing spar (120), said outer wing spar fastened to spar stiffener (142) by steel pins (144) or other fastening means, with said spar stiffener having a hole (143) to allow the passage of air or other objects, with said inner spar oriented by the contact of roller bearings (140) with said outer spar. The whole in said spar stiffener also allows necessary airflow as the wing is expanded or retracted, whether by air pressure or other means.

Figure 12:
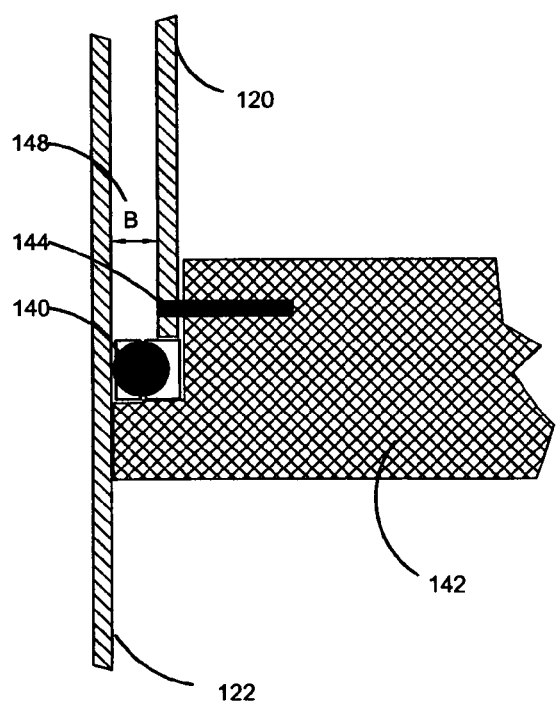
FIG. 12 shows an enlargement of a portion of FIG. 11.

FIG. 12 shows an enlargement of a portion of FIG. 11, with the terminus of the outer spar (120) being fastened to the spar stiffener (142) by means of a steel pin (144), with said outer spar contacting roller bearing (140), keeping said roller bearing in place against said spar stiffener. Said roller bearing contacts inner spar (122) to keep a relative spacing 'B' (148) between said inner and said outer spars. Not shown are possible sealing means as described above and shown in FIG. 10.

Figure 13:
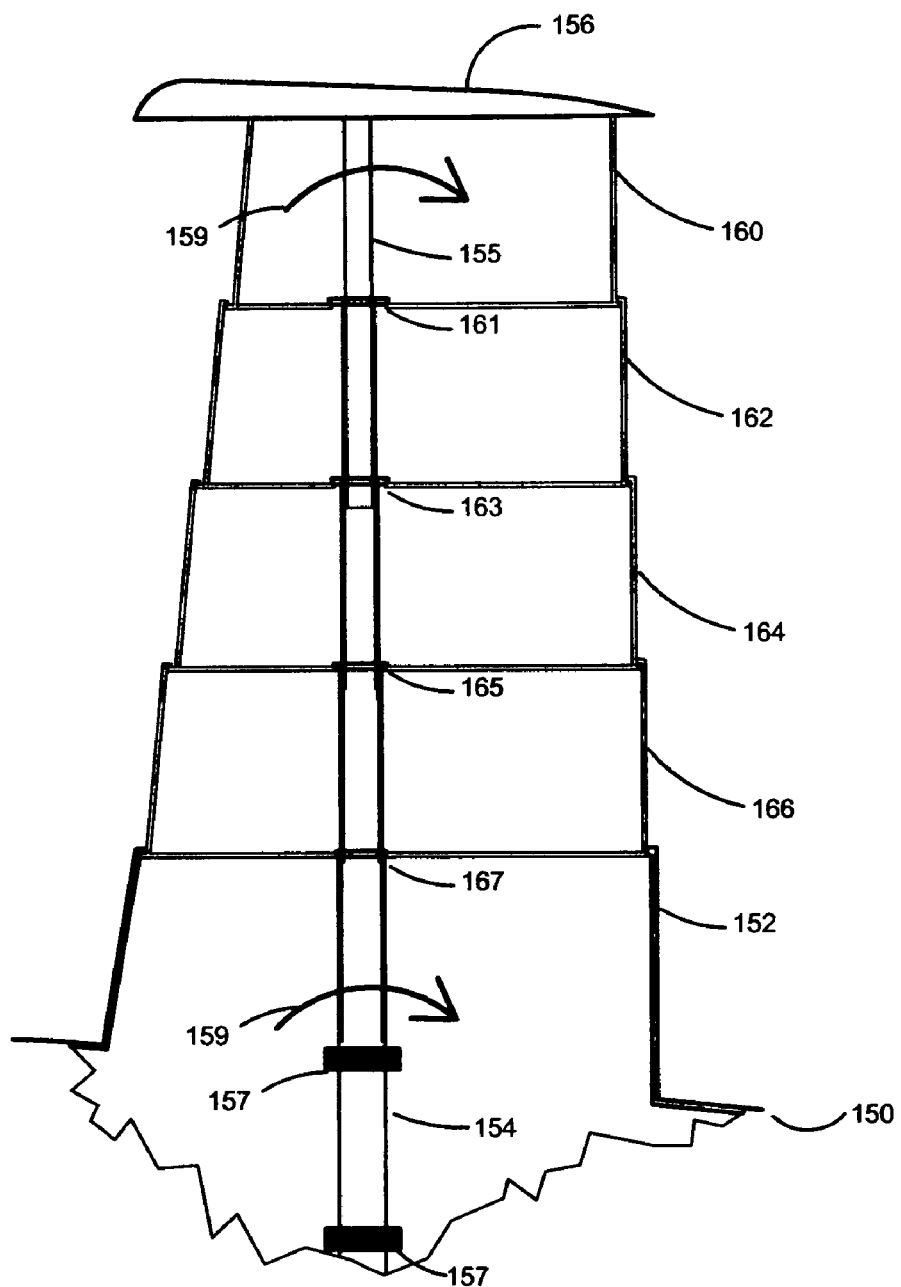
FIG. 13 shows a cross section of an extended wing with rotational forces causing wing warp.

FIG. 13 shows a schematic of how the wing extension means can also serve to provide for wing warping flight control. Shown is a small portion of the fuselage (150) upon which the wing root (152) is fixed. The telescoping spar (154) is shown in full extension, with outward spar (155) fixed to wing cap (156), said wing cap being also fixed to wing panel (160). Wing panel (160) is in contact with wing panel engagement device (161) attached to said telescoping spar, but said wing panel is free to rotate about said engagement device, said engagement device being a circular shape, regardless of the shape of said spar when wing warping is to be accomplished. If wing-warping control is not to be used, said engagement device might be of any shape. Similar contact is made, and rotation possible, at the other wing panels (162, 164, 166) and other wing panel engagement devices (163, 165, 167). As rotating force (159) is applied to said telescoping spar in the vicinity of said fuselage, said force is transmitted to wing panel (160) via wing cap (156). The outer wing panel (160) rotates in the direction of the applied force, causing a similar but smaller rotation in wing panel (162), which causes a similar but still smaller rotation in wing panel (164), and finally a very small rotation in wing panel (166) due to the restriction of rotation afforded by contact with said wing root. Bearings (157) attach main wing spar (154) to fuselage while providing rotating means to said spar. Rotating means are manifold, and a particular means of rotating is not of consequence to the present invention, as such is commonly known in the art.

Figure 14:
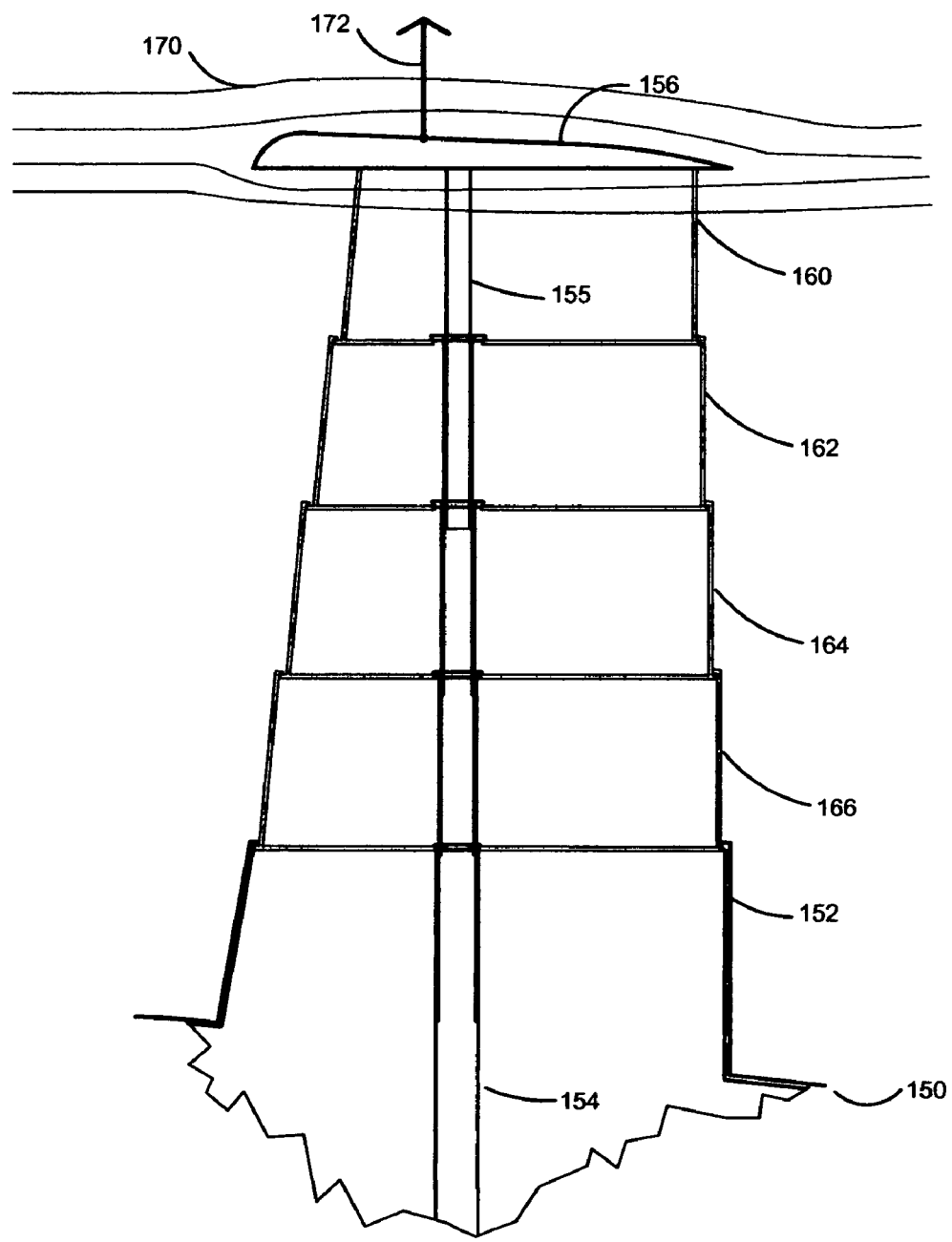
FIG. 14 shows a cross section of an extended wing along with a schematic of airflow across the wingtip, highlighting the ability to maintain wing extension during flight.

FIG. 14 shows an aerodynamic schematic drawing of the tip of the wing shown in FIG. 13, and having means to use airflow to keep the wing extended. Shown are wing panels (160, 162, 164, 166) attached to wing cap (156), said wing cap being also attached to telescoping wing spar (154). Said wing spar is shown protruding into fuselage (150) via wing root (152). Also shown are lines depicting airflow (170) as would be experienced by a flying wing, said airflow being forced around said wing cap to provide outward force (172) either by the shape or angle of said wing cap. Wing extension is maintained during flight by the action of said outward force, as long as forward velocity is sufficient to provide an outward force larger than any other force acting on the wing to retract it.

Figure 15:
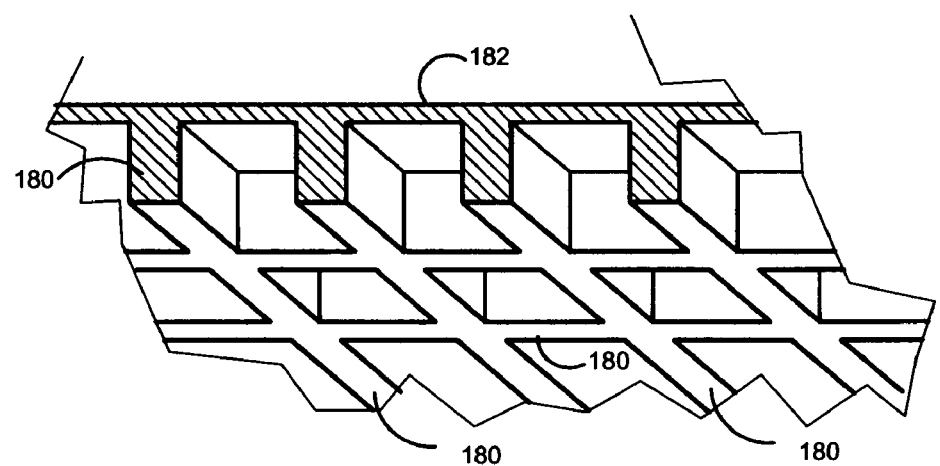
FIG. 15 shows an isometric drawing of a portion of the wing panel depicting wing panel construction for a hollow wing.
Figure 16:
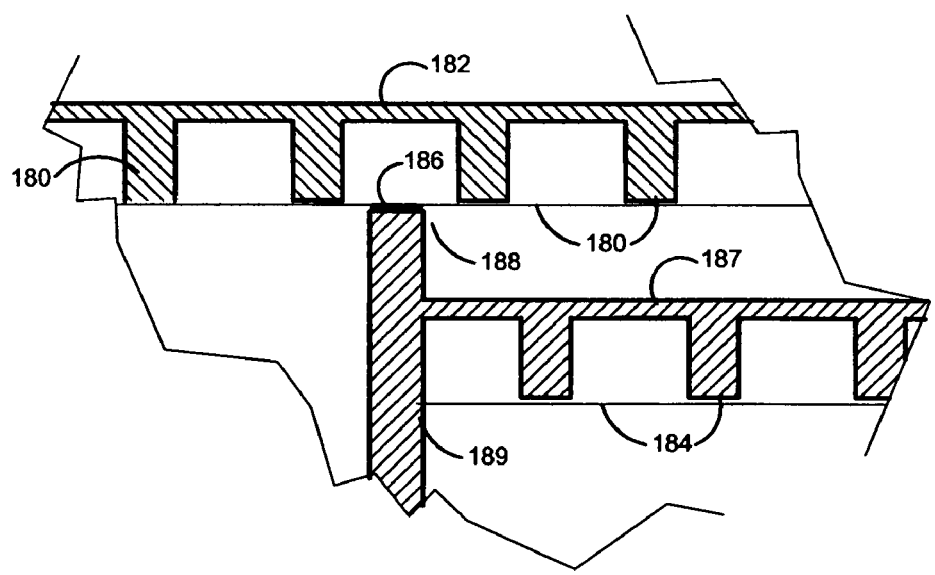
FIG. 16 shows a cross section of a wing panel skin and structure, and the interrelation of an adjacent wing panel.

FIG. 15 shows an isometric view of a portion of the wing panel to indicate the construction of a typical wing panel so as to retain its shape while being hollow to allow other wing panels to nestle within. Most wings contain a series of full-depth ribs that act to support a thin skin and help maintain the desired wing shape. Without full-depth ribs, a simple plastic or fiberglass panel would need to be unreasonably thick to withstand the compression forces acting on a wing surface. To alleviate the thickness requirement and provided an open interior to the wing panels, an open-ended honeycomb arrangement, or series of structural ribs (180) reinforces the interior of a thin wing panel skin (182) such that said wing panel skin structurally spans in two directions: 1) between the said closed end section of each wing panel and the said open end section of each wing panel (which is bearing upon the next said closed end section of each wing panel); and 2) between the leading edge of said wing panel and the trailing edge of said wing panel. If more depth is desired in said rib section for greater strength, the said wing panel extension can be slotted to allow for a deeper rib section along the axis of wing extension. Said ribs may be manufactured of a dimension to provide guidance of the wing panel extension as a smaller wing panel moves through the next largest wing panel. As shown in FIG. 16, which is a section of two adjacent wing panels. In this view, Teflon tape or a polished metal strip (186) along the wing panel extension surface (188) abutting the structural ribs (180) would provide a relatively simple friction-reducing device. Also shown is thin wing section (182) and the closed end wing panel (189). An angled leading edge, as shown in FIG. 3 (63) allows for a fairly deep structural rib through most of the said leading edge, which is important as the leading edge is typically a high-pressure zone on a wing. Wing pressures reduce toward the trailing edge, where the said structural ribs are necessarily smaller. It is not required to vary the depth of the said structural ribs, as long as the depth is sufficient to structurally support the said wing skin.

Figure 17:
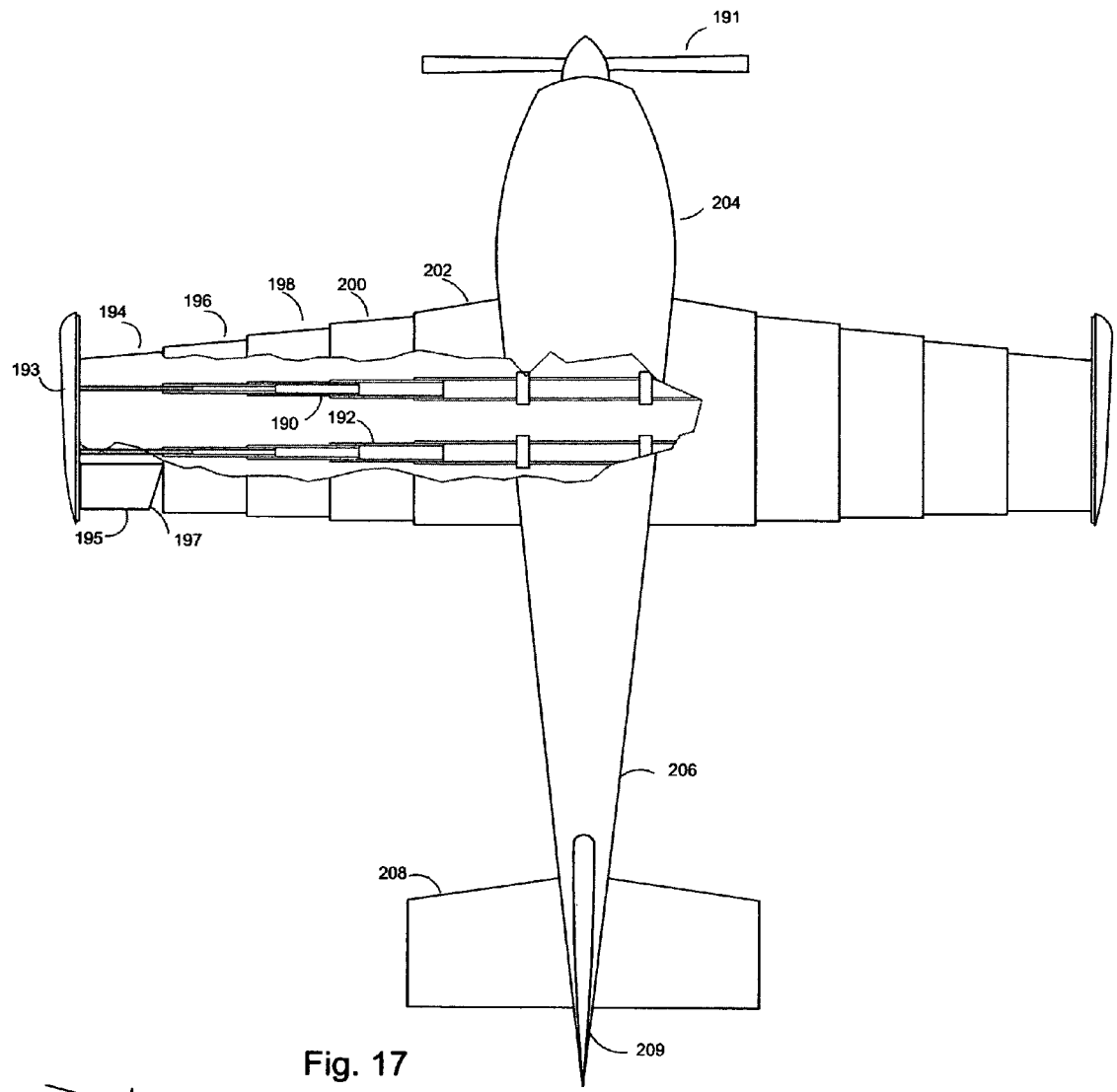
FIG. 17 shows an alternate embodiment of the present invention with other means than wing warp for flight control on an extendable wing.
Figure 18:
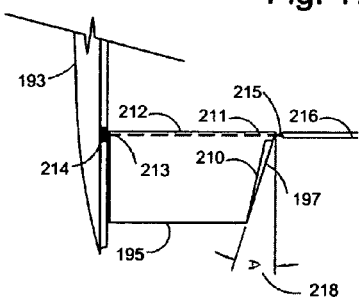
FIG. 18 shows an enlargement of the control surface utilized in FIG. 17.

An alternate embodiment of the invention, as it relates to flight control, is shown in FIG. 17. In this drawing, two retractable non-rotating wing spars are utilized, although it is also possible to utilize one wing spar. As the means of retracting the wing, and of the structural aspects of the retractable wing, have previously been described in FIG. 1 and other drawings, only the main elements are called out. Specifically indicated are the propellers (191), retractable wing spars (190, 192), wing panels (194, 196, 198, 200), a wing root (202) for storage of said wing panels and said wing spars, said wing root connected to the fuselage (204) of the aircraft, said fuselage also commonly having a tail section (206), a horizontal stabilizer (208) and vertical stabilizer (209). In order to collapse a wing having a control surface, commonly called an aileron, that may be in any operating position, a means is shown whereby the control surface may be oriented to the wing itself as the wing is retracted so as to prevent damage to the control surface, or prevent the wing from hanging up during retraction. In this case, wing panel (194), being connected to wing end cap (193), has a portion of the said panel replaced with a hinged flight control surface (195), said control surface having angled edge (197) located toward said fuselage such that as the extended wing starts to retract, the most inboard edge of said control surface (which is also located near the hinge of the control surface and hence nearest to being in plane with the non-control surface wing portions) contacts the inner surface of the hollow outside end of wing panel (196). As retraction of the said wing panels continue, the inner surface of the hollow outside end of wing panel (196) can be seen to dictate the orientation of the control surface (195) to line up with said wing panels, regardless of what position the said control surface is in at the start of retraction. FIG. 18 shows an enlarged view of the control surface (195), with an angle 'A' (218) of the inboard edge of said control surface to ease the orientation of said control surface into wing panel (196, not shown this view), and an optional chamfered edge (210) to angled edge (197) to further ease orientation of said control surface upon retraction of the wings. Also shown is one means of operating the said control surface, with rod (211), shown dashed and acting as a hinge, running through a portion of the forward edge (212) of the said control surface, with one end (213) placed in a bearing pocket (214) in a portion of the wing end cap (193). The other rod end (215) is connected to an extendable rotating rod (216) that operates similar to said retractable spars and is rotated by push-pull tubes or other means commonly known in the art for light aircraft aileron or elevator controls. Pilot interfaces, such as pedals or control stick or wheel, are also not shown as these are also commonly known in the art.

What is claimed as the present invention is:

1. A telescoping wing for a vehicle having a fuselage, the telescoping wing having the following characteristics:
    a. multiple hollow translating wing spars, with each translating wing spar configured to slide into the interior of the adjacent spar section toward the wing root for storage, and each hollow wing spar section of sufficient length to maintain a degree of overlap with respect to adjacent wing spars when extended, and where the cross-sectional shape of the translating wing spars may be of any closed shape;
    b. one or more main wing spars into which each of the other translating spar sections slide when collapsed, with said main wing spar having attaching means to be structurally supported by the fuselage;
    c. said translating and main spars having means to maintain the ability to rotate as a unit while extended to any degree, said means comprising a slot and pin arrangement or by a non-cylindrical shape of the spar;
    d. the wing surface of said wing consisting of wing panels surrounding said spars, with the individual wing panel end that is located toward the wing root closed to form a wing rib to maintain proper wing shape, and having a hole capable of passing said spars;
    e. said wing panels having a relatively open end at the wing tip side with the inside surface of said open end bearing upon the outside surface of the next outward wing panel when fully extended, and said wing panels shaped and sized to allow retraction of each panel into one another toward the wing root;
    f. the wing panel end closest to the wing tip being fixed to said wing tip, as is the spar section closest to the wing tip, so as to prevent uncontrolled wing rotation, wherein rotation of said spar rotates said wing tip, which generates wing warping along the length of said wing;
    g. said wing root comprised of a fixed hollow section attached to the fuselage of the vehicle or an area of the fuselage which houses the collapsed wing panels and wing spars.

2. The telescoping wing of claim 1, where left and right wings rotate in opposite direction for aileron control.

3. The telescoping wing of claim 1, where left and right wings rotate in same direction for elevator control.

4. The telescoping wing of claim 1, wherein the wing tips generate an aerodynamic component of lift outward along the wing, wherein the wing is held in extended position through force supplied by air movement over the wing tips.

5. The telescoping wing of claim 1, where the wing spar is retracted by cable, chain or other tension device.

6. The telescoping wing of claim 1, where the wing is extended or retracted by air pressure.

7. The telescoping wing of claim 1, where the two main bearing points of each individual wing spar section, when fully extended, have reinforcing means to stiffen the spar at the bearing points.

8. The telescoping wing of claim 1, where said wing spars are engaged in motion toward the wing tip by each respective wing panel, with said spars having a lip on the root side of said spar, with said wing panel having a hole sufficient to allow the passing of the spar that supports said wing panel, but not sufficient to pass the lip of said spar.

9. The telescoping wing of claim 1, with said wing panels having a retaining feature preventing the next outward wing panel from traveling beyond the outward edge of the adjoining inward wing panel.

10. The telescoping wing of claim 1, where seals are used at the ends of each spar section to contain air pressure within the telescoping spar.

11. The telescoping wing of claim 1, wherein the wing panels having a construction consisting of:
  a. an outer skin or surface;
  b. a ribbed reinforcement structure just within said outer skin, with the ribs protruding from said skin some distance toward the inner portion of the wing to stiffen said outer skin;
  c. wherein the closed end of the wing panel forms a full-depth rib in the chordwise direction;
  d. wherein the open end of the wing panel forms a lip in the chord-wise direction around said open end;
  e. wherein said ribs span from said closed end to said lip in the spanwise direction.

12. The telescoping wing of claim 11, wherein:
  a. each of said wing panels is of smaller chord and thickness at the open end than at the closed end; and
  b. rib interior surfaces in the span-wise direction running parallel with each other rather than following the shape of the wing surface, and of dimension so that the lip extends $1/16$" to $1/2$" beyond said rib interior surfaces on said open end of each said wing panel.

13. The telescoping wing of claim 1, wherein:
  a. said wing spars have a roller mechanism allowing for a reduction of friction during extension, with at least one roller bearing located on the bottom outside of the outer end of each spar and one roller bearing located on the upper end of the inner end of each spar, wherein no roller bearing is located on the upper side of the outermost end of each spar; and
  b. wherein said wings spars experience a friction-enhanced connection when fully extended and an airfoil load is placed on said spar.

14. The telescoping wing of claim 1, wherein said overlap is a minimum overlap of one third of the spar length of each spar with the adjacent spars.

\* \* \* \* \*